3,046,750
PRE-PURIFYING STAGE FOR GAS
LIQUEFACTION PLANTS
Rudolf Becker, Munich-Solln, Germany, assignor to Gesellschaft für Linde's Eismaschinen Aktiengesellschaft, Munich, Germany, a German company
Filed Aug. 3, 1959, Ser. No. 831,441
Claims priority, application Germany Aug. 6, 1958
3 Claims. (Cl. 62—13)

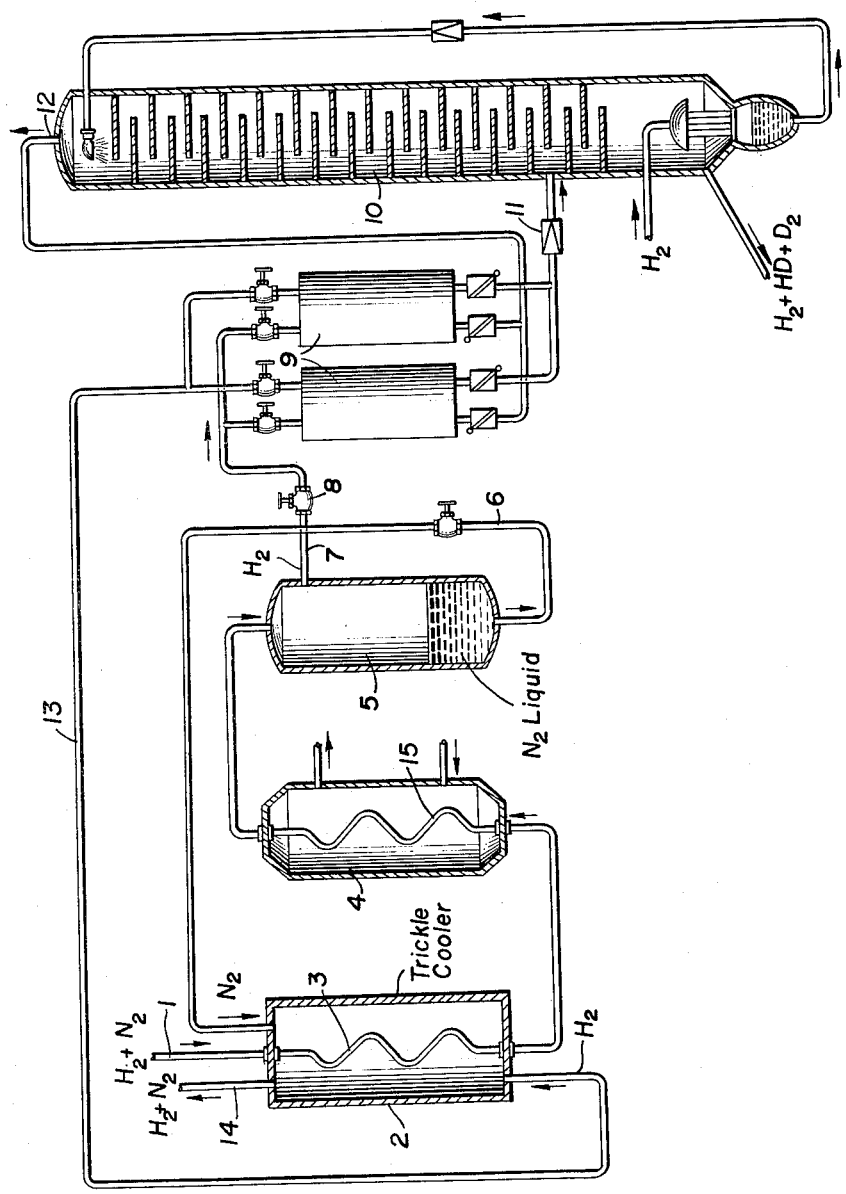

This invention relates to a process and a means for the separation of undesirable admixtures from gas mixtures before the latter are led into a gas liquefaction plant, for example a low-temperature rectification plant for the separation of gas mixtures or for obtaining certain fractions from such gas mixtures. Hitherto the usual method has been to lead the gas mixture that is to be liquefied or separated through a reversible heat exchanger set-up, especially in the form of regenerators or reversing exchangers, prior to feeding it into a rectifier column arrangement. In so doing, the compressed initial mixture is generally caused to exchange heat with at least one of the separation products and thereby cooled to such an extent that in the regenerator or the like through which the mixture flows those components of the gas mixture which are condensable at that temperature are separated. In the next operational period the compressed crude gas mixture flows through a different cross-section of the heat exchanger arrangement, while the condensed-out components in the cross-section through which the separation product flows in the second period are sublimated again and removed from the heat exchanger or regenerator set-up.

The separation of the undesirable admixtures in the described way by condensation and subsequent removal by sublimation hence proceeds in an almost "reversible" manner, requiring merely the cooling energy needed for condensation, the greater part of which is regained by the subsequent sublimation process.

Now, in order to prevent, at least to a certain extent, the separation of liquid during the described process, which liquid separation would, if in excess of a certain minimum amount, hinder the flow of gas through the heat exchanger or regenerator and deleteriously affect the desired process, frequently there is interposed, ahead of the condensing-out stage employing regenerators or the like, a purification stage in which the components which liquefy above their triple points are separated by the application of low temperatures and/or by means of a washing process. Such washing stages, which may operate at fairly low temperatures, though such temperatures are nevertheless above the respective triple point, are placed, in certain circumstances, as the sole pre-purifying stage ahead of a gas liquefaction or gas separation stage, if in the latter gases or gas mixtures are processed, in which a condensing out of certain admixtures from the crude gas mixture below their triple points is not necessary.

The conventional pre-purifying stages of the described type hitherto generally operated in such manner that the crude gas components to be removed were retained and separated out by means of a solid, liquid and/or gaseous medium by adsorption or absorption, in particular by solution in a washing liquid, in some cases with the formation of a chemical bond. The agent effecting such precipitation was then either destroyed and replaced by a new agent, or subjected to a separated regeneration process in which, where necessary, the precipitated substances were won for other purposes by chemical and/or physical means.

Hence, in the described conventional method it was necessary invariably to accept a certain loss of energy which, in some instances, was combined with a loss of materials, for instance washing agent.

The object of the invention is to arrange and carry out the means and the process for the implementation of such a liquid separating purifying stage in such manner that the actual gas processing, especially the gas liquefaction and/or separating process for which the said liquid separating purifying stage serves merely as an auxiliary stage, is burdened by such auxiliary stage as little as possible in respect of both energy and the accumulation of by-products that must be further treated in a process distinct from the actual gas-treating process.

In accordance with the invention this is achieved by the component separated out in the liquid separating purifying stage—after treatment of the resulting gas destined for further treatment in the subsequent gas-treating, and especially gas-liquefying and/or gas-separating plant—being at least partially taken up again by at least a part of the end-products or of the treated gas freed by the end-product and then again removed from the plant altogether.

In this manner, in accordance with the invention, it is achieved that in the purifying liquid separating stage—analogous to the separation of condensates in regenerators—at least a part of both the gases for further processing and the separated liquid undergo a twofold heat exchange and is passed out of the entire plant along the same route by which the two together passed in; this gives an almost reversible process in which the heating or cooling energy utilized for pre-purification is regained in optimum by the second heat exchange process.

In this procedure—likewise analogous to regenerator condensation—compressed or highly compressed gas is normally fed into the liquid separating purifying stage, while the components separated in the liquid phase are taken up again by processed gas or gas mixture at low pressure, preferably about atmospheric pressure.

In accordance with a special form of the invention, the initially compressed separated liquid in the liquid separating purifying stage is first at least partly returned to the gaseous phase by reducing the pressure, possibly to atmospheric pressure, and in this state is taken up by backward stream of processed gas.

The liquid separating purifying stage according to the invention may, in principle, be interposed in some way directly or indirectly ahead of a low-temperature rectification stage. The principal application considered is the interposition as a preliminary stage for a condensation stage operating mainly below the temperature at which substances are separated out in the solid state, for instance with regenerators.

In accordance with a special form of the invention, the process according to the invention may be carried out, for instance, by means of a trickling cooler as described in German Patent No. 524,352. In such cooler, for the purpose of separating gas mixtures, especially for the production of hydrogen by vaporization of low-boiling liquids in a non-condensing auxiliary gas, the low-boiling cooling liquid is gradually vaporized in the presence of said auxiliary gas over a wide range of temperature by heat exchange with the mixture to be cooled, in which process the auxiliary gas preferably flows in the opposite direction to that of the mixture to be cooled. The cooling liquid and likewise the auxiliary gas are preferably taken from the separation product itself.

This known procedure, which per se was intended as an independent gas separating procedure, is particularly suitable as a liquid separating purifying stage in accordance with the invention when from a gas components of especially low boiling point are separated out, which are preferably contained in such gas in relatively small quantities, possibly only in traces. The application primarily considered here is the separation of rare gases from nitrogen or the separation of deuterium from hydrogen, or the production of other isotopes by low-temperature rectification.

In the following the invention is described on the basis of one possible method of carrying out the process according to the invention as illustrated in the drawing.

At 1 a mixture of hydrogen and nitrogen enters the plant at a pressure of about 8 atmospheres. 2 represents a trickling cooler through the coil system 3 of which the hydrogen-nitrogen mixture is passed and is cooled to below the dew point of the mixture by liquid nitrogen trickling over said coils and thereby vaporizing. The resulting mixture of liquefied nitrogen and gaseous hydrogen flows through a heat exchanger 4 and thereafter passes to a separator 5. In the latter the liquid nitrogen collects on the bottom and is then expanded through an expansion valve 6 into the external space of the trickling cooler 2. The pure hydrogen, which is to a great extent free of nitrogen, flows out of the separator 5 at 7, is further expanded to about 6 atmospheres in a valve 8, flows through a regenerator arrangement 9 and after repeated expansion in a valve 11 flows to a rectifying column 10. The hydrogen which, after separation of the hydrogen enriched with deuterium, escapes at 12 at the head of the column, flows through the regenerator 9 back through the conduit 13 into the bottom of the trickling cooler 2. There it again takes up from the counterstream coming from valve 6 nitrogen of which at least part is converted into the gaseous phase, and together with said nitrogen it leaves the head of the trickling cooler 2 at 14 as a hydrogen-nitrogen mixture. Through the second cross-section 15 of the heat exchanger 4 flows a cooling stream, for example a nitrogen or hydrogen stream, which is led off from the above apparatus and which possesses a certain constant temperature and serves to fix the working temperature of the liquefying process of the nitrogen liquefied in the trickling cooler 2.

It is within the scope of the invention to connect up in series several aggregates consisting of parts 2 and possibly 4 in order to guarantee an adequate liquid separation of nitrogen; it is further possible to arrange at least one cooler or liquefier in parallel, which serves as a reserve in case of need or may be operated alternately with the described means in a certain periodic rhythm.

What I claim is:

1. A process for the purification of a compressed gas mixture by separating at least a part of the impurities thereof in liquid form, which comprises cooling said compressed gas mixture, thereby liquefying at least part of said impurities, separating said liquid impurities from the resulting gas, treating said resulting gas in a gas separation plant, thereby expanding it to low pressure, throttling the liquid impurities to said low pressure, vaporizing at least part of said liquid in counter current with at least part of the treated gas, thereby cooling said compressed gas mixture to be purified in indirect heat-exchange, and withdrawing the mixture of said treated gas and said vaporized impurities together from the plant.

2. Process according to claim 1 in which said resulting gas is passed into a condensation stage preferably regenerators, operating mainly below the temperature at which impurities are separated out in solid state.

3. Apparatus for the purification of a compressed gas mixture by separating at least part of the impurities in liquid form comprising a trickle cooler with coil systems for passing a compressed gas mixture, a separator, a low temperature gas separating plant, means connecting said trickle cooler with the head of said separator, conduit means passing the resulting gas from the upper part of said separator to the input of said gas-separation plant, valved connecting means for withdrawing liquid from the bottom of said separator and passing it into the trickle cooler, means connecting the output of said gas separation plant with the trickle cooler in such manner, that, due to their relative locations, the entry points of both connecting means ensure a thorough mixing of the two streams of gas flowing in opposite directions.

References Cited in the file of this patent
UNITED STATES PATENTS
2,760,352     Hachmuth _____ Aug. 28, 1956

OTHER REFERENCES

Chemical Engineering Progress, published by American Institute of Chemical Engineers, May 1954, pages 226 to 228 relied on.